(12) United States Patent
Kim et al.

(10) Patent No.: US 9,958,737 B2
(45) Date of Patent: May 1, 2018

(54) LIQUID CRYSTAL DISPLAY

(71) Applicant: Samsung Display Co., LTD., Yongin-si, Gyeonggi-Do (KR)

(72) Inventors: Hoon Kim, Yongin-si (KR); Hyunjoon Kim, Yongin-si (KR); Kichul Shin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 78 days.

(21) Appl. No.: 14/996,567

(22) Filed: Jan. 15, 2016

(65) Prior Publication Data

US 2016/0349569 A1    Dec. 1, 2016

(30) Foreign Application Priority Data

Jun. 1, 2015    (KR) .................. 10-2015-0077480

(51) Int. Cl.
  *G02F 1/1362*    (2006.01)
  *G02F 1/1343*    (2006.01)

(52) U.S. Cl.
  CPC .... *G02F 1/134309* (2013.01); *G02F 1/13624* (2013.01); *G02F 2001/134345* (2013.01); *G02F 2202/10* (2013.01)

(58) Field of Classification Search
  CPC .................................................. G02F 1/13624
  See application file for complete search history.

(56) References Cited

U.S. PATENT DOCUMENTS

2008/0303965 A1   12/2008   Kim
2011/0261028 A1   10/2011   Goh et al.
2013/0077002 A1    3/2013   Yoon et al.

FOREIGN PATENT DOCUMENTS

| JP | 04346318 A | * 12/1992 |
| KR | 1020080107149 A | 12/2008 |
| KR | 1020110117998 A | 10/2011 |
| KR | 1020130033802 A | 4/2013 |

* cited by examiner

*Primary Examiner* — Kendrick Hsu
(74) *Attorney, Agent, or Firm* — Cantor Colburn LLP

(57) ABSTRACT

A liquid crystal display includes a first substrate on which a first sub-pixel electrode and a second sub-pixel electrode are spaced apart from each other in a first direction, different voltages being applied to the first sub-pixel electrode and the second sub-pixel electrode, a first switching element which controls a voltage applied to the first sub-pixel electrode, a second switching element which controls a voltage applied to the second sub-pixel electrode, a variable resistor which drops an output voltage of the second switching element and apply the dropped output voltage to the second sub-pixel electrode, a second substrate on which a common electrode is disposed, and a liquid crystal layer disposed between the first substrate and the second substrate.

14 Claims, 9 Drawing Sheets

LIQUID CRYSTAL DISPLAY

This application claims priority to Korean Patent Application No. 10-2015-0077480, filed on Jun. 1, 2015, and all the benefits accruing therefrom under 35 U.S.C. § 119, the content of which in its entirety is incorporated herein by reference.

BACKGROUND

1. Field

One or more exemplary embodiments relate to a liquid crystal display ("LCD").

2. Description of the Related Art

A liquid crystal display ("LCD") is one of the most widely used flat panel displays. The LCD generally includes two display substrates and a liquid crystal layer disposed therebetween. In the two display substrates, field-generating electrodes, such as a pixel electrode and a common electrode, are respectively formed.

In the LCD, an electric field is generated in the liquid crystal layer by applying a voltage to the field-generating electrodes, an orientation of liquid crystal molecules of the liquid crystal layer is determined by the generated electric field, and an image is displayed by controlling a polarization of incident light. The LCD further includes a switching element connected to each pixel electrode, and a plurality of signal lines, such as a gate line and a data line, configured to apply a voltage to the pixel electrode by controlling the switching element.

A vertically aligned mode LCD drives a liquid crystal by using an electric field formed in a direction perpendicular to a substrate, and an in-plane switching mode LCD drives a liquid crystal by using a horizontal electric field formed in a direction parallel to a substrate.

The vertically aligned mode LCD is widely used due to advantages thereof, such as an excellent contrast ratio and a wide viewing angle.

SUMMARY

In order to make lateral visibility closer to front visibility in a vertically aligned mode liquid crystal display ("LCD"), there has been proposed a method of changing transmittance of a single pixel by dividing the single pixel into two sub-pixels and applying different voltages to the two sub-pixels. In this case, in addition to two switching elements for controlling the two sub-pixels, a switching element for a voltage division is further used for applying different voltages to the two sub-pixels, causing a reduction in an aperture ratio.

One or more exemplary embodiments include at LCD in which a single pixel region is divided into a plurality of sub-pixel regions, transmittances in the plurality of sub-pixel regions are adjusted, and the visibility and an aperture ratio thereof are improved.

According to one or more exemplary embodiments, an LCD includes a first substrate on which a first sub-pixel electrode and a second sub-pixel electrode are spaced apart from each other in a first direction, different voltages being applied to the first sub-pixel electrode and the second sub-pixel electrode, a first switching element which controls a voltage applied to the first sub-pixel electrode, a second switching element which controls a voltage applied to the second sub-pixel electrode, a variable resistor which drops an output voltage of the second switching element and applies the dropped output voltage to the second sub-pixel electrode, a second substrate on which a common electrode is disposed, and a liquid crystal layer disposed between the first substrate and the second substrate.

In an exemplary embodiment, the variable resistor may include a control electrode, an insulating layer covering the control electrode, a channel layer disposed on the insulating layer, the channel layer including a semiconductor material, and an input electrode and an output electrode spaced apart from each other on the channel layer.

In an exemplary embodiment, an area of the control electrode facing the channel layer may be larger than or equal to an area of the input electrode and the output electrode facing the channel layer.

In an exemplary embodiment, the control electrode may include first and second control electrodes respectively facing the input electrode and the output electrode and spaced apart from each other in the first direction, and widths of the first and second control electrodes in the first direction may be greater than or equal to widths of the input electrode and the output electrode in the first direction.

In an exemplary embodiment, a voltage applied to the control electrode may be higher than a voltage applied to the input electrode.

In an exemplary embodiment, the variable resistor may share channel layers provided in the first and second switching elements.

In an exemplary embodiment, the LCD may further include a high-concentration semiconductor layer between the channel layer and the input electrode and between the channel layer and the output electrode.

In an exemplary embodiment, the channel layer may include amorphous silicon (a-Si).

In an exemplary embodiment, a resistance value of the variable resistor may be adjusted in the range of about 0.1 mega-ohms (MΩ) to about 1,000 MΩ.

In an exemplary embodiment, the LCD may further include a storage electrode surrounding the first sub-pixel electrode, wherein the control electrode is connected to the storage electrode.

In an exemplary embodiment, at least a portion of the storage electrode may overlap the first sub-pixel electrode at an edge of the storage electrode.

In an exemplary embodiment, the first sub-pixel electrode may include a cross-shaped stem electrode and a plurality of branch electrodes extending from the cross-shaped stem electrode.

In an exemplary embodiment, at least one of the plurality of branch electrodes extending toward the edge of the storage electrode may extend to overlap the storage electrode.

In an exemplary embodiment, the edge of the storage electrode may protrude toward at least one of the plurality of branch electrodes.

In an exemplary embodiment, the LCD may further include a storage electrode surrounding the first sub-pixel electrode, where the control electrode is electrically separated from the storage electrode.

Additional exemplary embodiments will be set forth in part in the description which follows and, in part, will be apparent from the description, or may be learned by practice of the presented embodiments.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Figure 1:
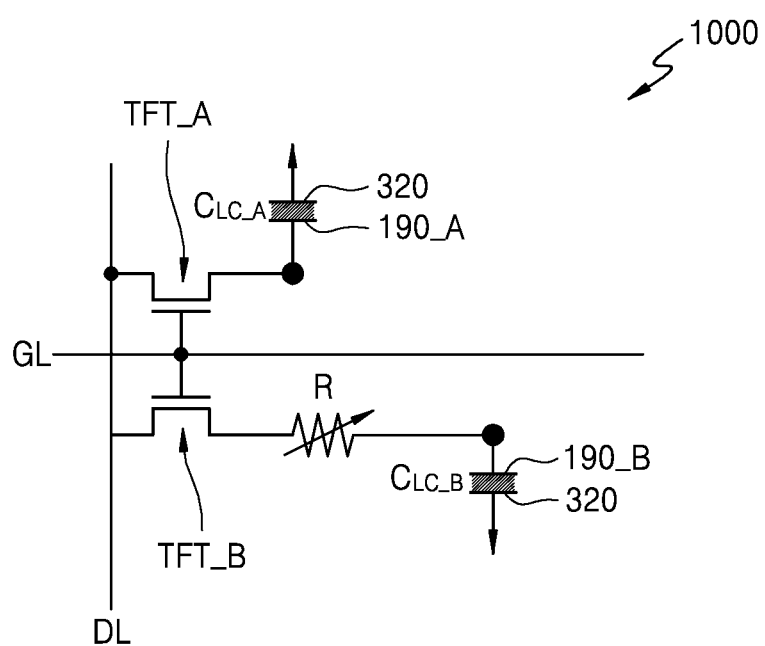
FIG. 1 is an equivalent circuit diagram of an exemplary embodiment of a pixel of a liquid crystal display ("LCD"), according to the invention.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain exemplary embodiments of the description. Expressions such as "at least one of" when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Sizes of elements in the drawings may be exaggerated for convenience of explanation. In other words, since sizes and thicknesses of components in the drawings are arbitrarily illustrated for convenience of explanation, the following embodiments are not limited thereto.

FIG. 1 is an equivalent circuit diagram of a pixel of a liquid crystal display ("LCD") 1000, according to an exemplary embodiment.

Referring to FIG. 1, the pixel of the LCD 1000 may include a gate line GL through which a gate signal is transferred, a data line DL through which a data signal is transferred, and a first switching element TFT_A and a second switching element TFT_B connected to the gate line GL and the data line DL. A first liquid crystal capacitor $C_{LC\_A}$ may be connected to the first switching element TFT_A, a variable resistor R may be connected to the second switching element TFT_B, and a second liquid crystal capacitor $C_{LC\_B}$ may be connected to the variable resistor R. Electrodes of the first liquid crystal capacitor $C_{LC\_A}$ may be a first sub-pixel electrode 190_A and a common electrode 320. The first sub-pixel electrode 190_A may be connected to an output terminal of the first switching element TFT_A via a contact hole. In addition, electrodes of the second liquid crystal capacitor $C_{LC\_B}$ may be a second sub-pixel electrode 190_B and the common electrode 320. The second sub-pixel electrode 190_B may be connected to an output terminal of the variable resistor R via a contact hole.

In an exemplary embodiment, the first switching element TFT_A and the second switching element TFT_B may be three-terminal elements, such as thin film transistors. In this case, control terminals of the first switching element TFT_A and the second switching element TFT_B may be connected to the gate line GL, and input terminals of the first switching element TFT_A and the second switching element TFT_B may be connected to the data line DL. An output terminal of the first switching element TFT_A may be connected to the first liquid crystal capacitor $C_{LC\_A}$, and an output terminal of the second switching element TFT_B may be connected to an input terminal of the second liquid crystal capacitor $C_{LC\_B}$ via the variable resistor R.

When a gate-on signal is applied to the gate line GL, the first switching element TFT_A and the second switching element TFT_B, which are connected to the gate line GL, may be turned on. Therefore, a data voltage applied to the data line DL may be applied to the first sub-pixel electrode 190_A through the turned-on first switching element TFT_A. In addition, the data voltage applied to the data line DL may be applied to an input terminal of the variable resistor R through the turned-on second switching element TFT_B. The data voltage may drop due to the variable resistor R and the dropped data voltage may be applied to the second sub-pixel electrode 190_B.

The variable resistor R may be designed by considering a ratio of voltages to be applied to the first sub-pixel electrode 190_A and the second sub-pixel electrode 190_B. Therefore, transmittances of two sub-pixels 190_A and 190_B may be changed. A detailed structure of the variable resistor R will be described below.

Since a single pixel includes the first liquid crystal capacitor $C_{LC\_A}$ and the second liquid crystal capacitor $C_{LC\_B}$ that are charged with different levels of voltages, different electric field strengths may be applied to liquid crystal molecules corresponding to the first liquid crystal capacitor $C_{LC\_A}$ and the second liquid crystal capacitor $C_{LC\_B}$. Thus, tilt angles of the liquid crystal molecules may be different and brightness of each pixel region may be different accordingly. By dividing the single pixel into a plurality of regions having different brightness and gradually adjusting a change in transmittance according to a gray scale, it is possible to prevent rapid change of the transmittance according to the gray scale at a lateral side of the pixel and it is possible to obtain lateral visibility that is close to front visibility. In addition, since two contact holes are used in the exemplary embodiment, an aperture ratio may be high, as compared to a conventional structure in which three holes are used.

Figure 2:
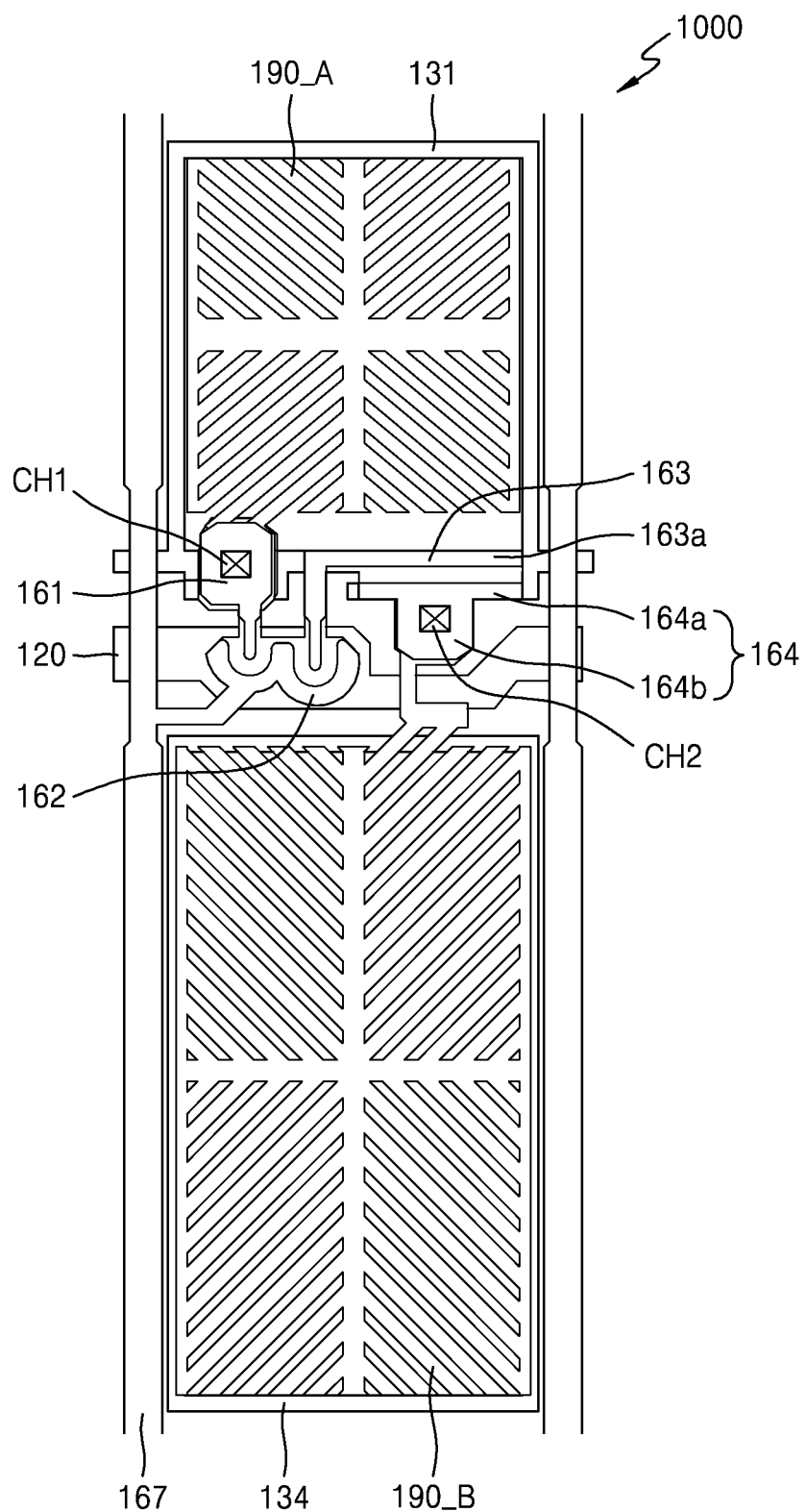
FIG. 2 is a plan view of an exemplary embodiment of a structure of a single pixel of an LCD, according to the invention.
Figure 3:
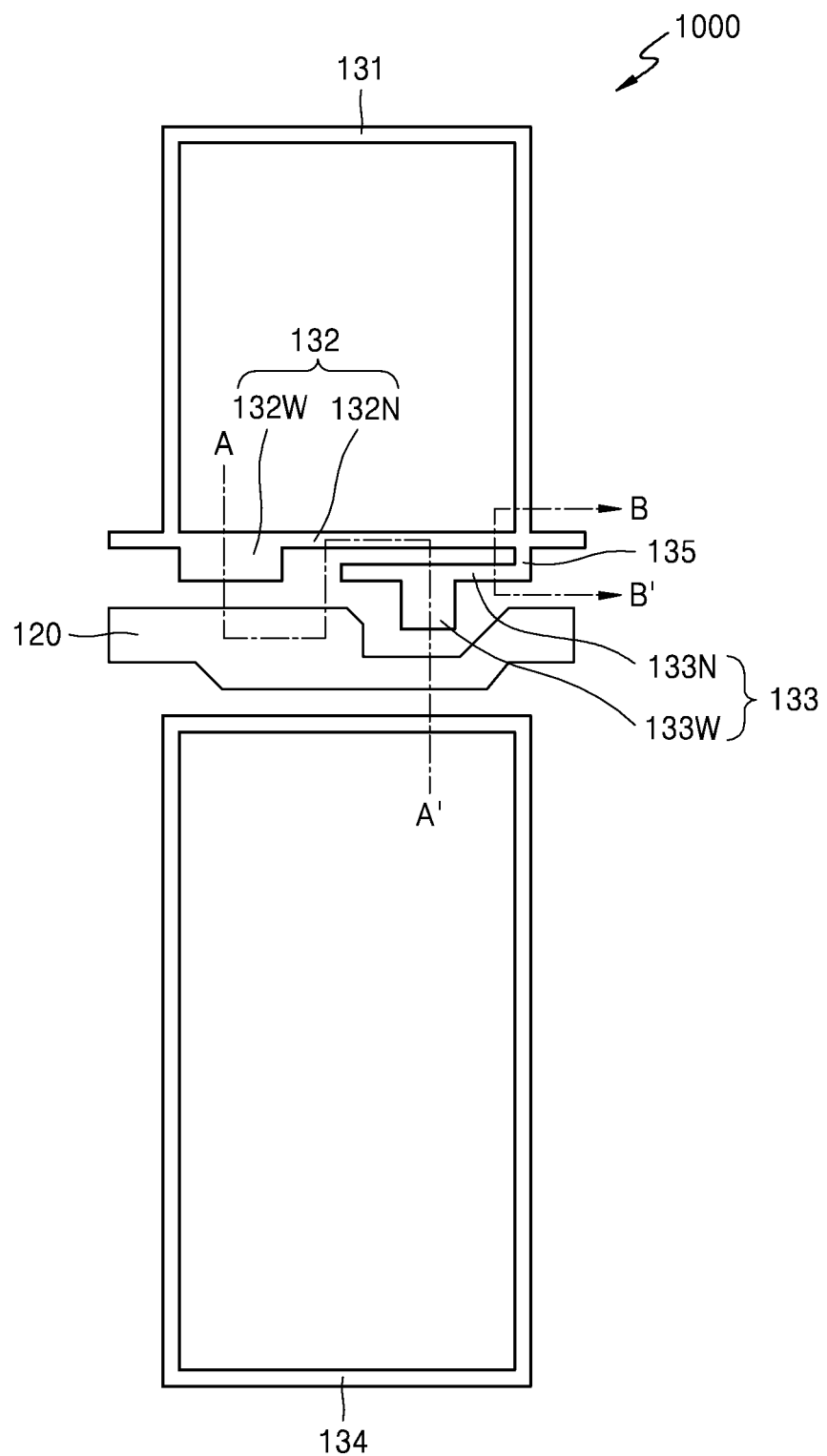
FIG. 3 is a plan view of a layer on which a gate electrode, storage electrodes, and voltage-division electrodes are disposed in the structure of FIG. 2.
Figure 4:
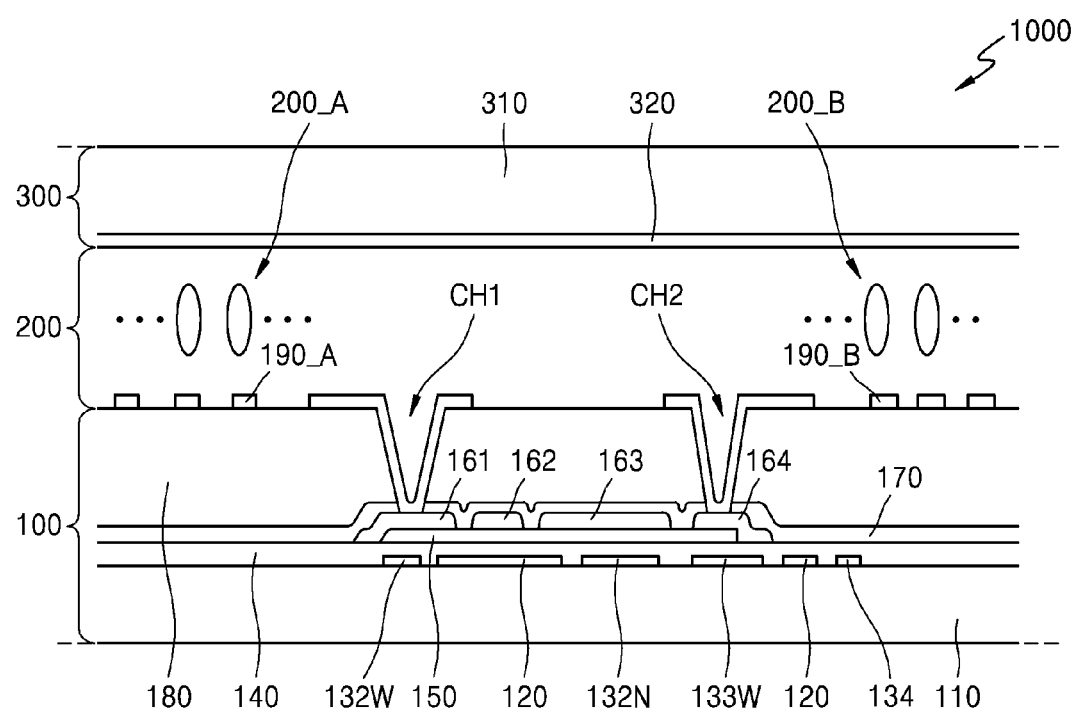
FIG. 4 is a cross-sectional view taken along line A-A' of FIG. 3.

A detailed structure of the LCD 1000 according to the exemplary embodiment will be described below with reference to FIGS. 2 to 4. FIG. 2 is a plan view of a structure of the single pixel of the LCD 1000, according to an exemplary embodiment, FIG. 3 is a plan view of a layer on which a gate electrode 120, first and second storage electrodes 131 and 134, and first and second voltage-division electrodes 132 and 133 are disposed in the structure of FIG. 2, and FIG. 4 is a cross-sectional view taken along line A-A' of FIG. 3.

The LCD 1000 may include a lower substrate 100 and an upper substrate 300 facing each other, and a liquid crystal layer 200 disposed between the lower substrate 100 and the upper substrate 300.

First, the configuration of the lower substrate 100 will be described in detail.

The gate electrode 120 and the first and second voltage-division electrodes 132 and 133 may be disposed on a first substrate 110. The first substrate 110 may include transparent glass or plastic. In addition, the first and second storage electrodes 131 and 134 may be disposed on the first substrate 110.

As described above with reference to FIG. 1, the gate electrode 120 may be connected to the gate line GL to apply a control voltage to the first and second switching elements TFT_A and TFT_B.

The first storage electrode 131 may be connected to the first and second voltage-division electrodes 132 and 133. The first and second voltage-division electrodes 132 and 133 may be spaced apart from each other side-by-side and be connected to each other by a connection electrode part 135. The first voltage-division electrode 132 may include a wide-width region 132W having a wide width in a longitudinal direction and a narrow-width region 132N having a narrow width in the longitudinal direction. The second voltage-division electrode 133 may include a wide-width region 133W having a wide width in the longitudinal direction and a narrow-width region 133N having a narrow width in the longitudinal direction. Here, the longitudinal direction is a vertical direction in FIG. 3 and refers to a direction from a center of the first sub-pixel electrode 190_A (refer to FIG. 2) to a center of the second sub-pixel electrode 190_B (refer to FIG. 2). The first and second voltage-division electrodes 132 and 133 may apply the control voltage to the variable resistor R described above with reference to FIG. 1. In other words, the resistance of the variable resistor R may be controlled by adjusting the voltages applied to the first and second voltage-division electrodes 132 and 133. In exemplary embodiments, a resistance value required for a voltage division may be obtained by appropriately adjusting areas of the first and second voltage-division electrodes 132 and 133. In an alternative exemplary embodiment, a resistance value required for a voltage division may be obtained by appropriately adjusting the widths of the narrow-width regions 132N and 133N. Hereinafter, the narrow-width regions 132N and 133N may also be referred to as control electrodes 132N and 133N in the description of the variable resistor R.

A gate insulator 140 may be disposed on the gate electrode 120, the first and second voltage-division electrodes 132 and 133, and the first and second storage electrodes 131 and 134. In an exemplary embodiment, the gate insulator 140 may include, for example, silicon nitride (SiNx), but is not limited thereto. In an exemplary embodiment, the gate insulator 140 may include an insulating material or a high-k dielectric.

A channel layer 150 including a semiconductor material may be disposed on the gate insulator 140. In an exemplary embodiment, the semiconductor material may include amorphous silicon, for example, a-Si:H.

Source/Drain ("S/D") metal layers 161, 162, 163, and 164 may be disposed on the channel layer 150. A high-concentration semiconductor layer (not illustrated) for an ohmic contact may be disposed between the channel layer 150 and the S/D metal layers 161, 162, 163, and 164.

The gate electrode 120, the channel layer 150, and the S/D metal layers 161 and 162 may constitute the first switching element TFT_A described above with reference to FIG. 1. The S/D metal layer 162 may be an input electrode and the S/D metal layer 161 may be an output electrode. The S/D metal layer 161 may include an extension portion for contacting the first sub-pixel electrode 190_A.

The gate electrode 120, the channel layer 150, and the S/D metal layers 162 and 163 may constitute the second switching element TFT_B described above with reference to FIG. 1. The S/D metal layer 162 may be an input electrode and the S/D metal layer 163 may be an output electrode.

The first and second voltage-division electrodes 132 and 133, the channel layer 150, and the S/D metal layers 163 and 164 may constitute the variable resistor R described above with reference to FIG. 1.

A region of the S/D metal layer 163 facing the narrow-width region 132N of the first voltage-division electrode 132 is denoted by reference numeral 163a. Hereinafter, the region 163a may also be referred to as an input electrode 163a in the description of the variable resistor R. In addition, the S/D metal layer 164 may include a region 164a facing the narrow-width region 133N of the second voltage-division electrode 133 and an extension portion 164b for contacting the second sub-pixel electrode 190_B. Hereinafter, the region 164a may also be referred to as an output electrode 164a in the description of the variable resistor R.

In addition, a data line 167 may be disposed on the gate insulator 140 and be connected to the S/D metal layer 162.

A passivation layer 170 may be disposed on the S/D metal layers 161, 162, 163, and 164, and a color filter 180 may be disposed on the passivation layer 170.

In an exemplary embodiment, the passivation layer 170 may include an inorganic insulating film, such as a silicon nitride film or a silicon oxide film. The passivation layer 170 may prevent a pigment of the color filter 180 from being introduced to the channel layer 150. In addition, although not illustrated, a passivation layer may be further disposed on the color filter 180. Such a passivation layer may prevent the color filter 180 from being lifted and suppress contamination of the liquid crystal layer 200 due to an organic material such as a solvent introduced from the color filter 180, thus preventing defects, such as image sticking, from occurring during a display driving.

The first and second sub-pixel electrodes 190_A and 190_B may be disposed on the color filter 180. As illustrated, each of the first and second sub-pixel electrodes 190_A and 190_B may include a cross-shaped stem electrode and a plurality of branch electrodes extending from the cross-shaped stem electrode, but is not limited thereto. In an exemplary embodiment, the first and second sub-pixel electrodes 190_A and 190_B may include a transparent conductive material such as indium tin oxide ("ITO") or indium zinc oxide ("IZO"). A first alignment film (not illustrated) may be disposed on the first and second sub-pixel electrodes 190_A and 190_B.

First and second contact holes CH1 and CH2 may pass through the passivation layer 170 and the color filter 180 to expose the S/D metal layers 161 and 164. The first sub-pixel electrode 190_A may be connected to the S/D metal layer 161 through the first contact hole CH1. In other words, the first sub-pixel electrode 190_A may be physically and electrically connected to the S/D metal layer 161 through the first contact hole CH1 and receive an output voltage of the first switching element TFT_A. In addition, the second sub-pixel electrode 190_B may be connected to the S/D metal layer 164 through the second contact hole CH2. In other words, the second sub-pixel electrode 190_B may be physically and electrically connected to the S/D metal layer 164 through the second contact hole CH2 and receive an output voltage of the variable resistor R.

As described above with reference to FIG. 1, since the first and second switching elements TFT_A and TFT_B are connected to the same gate line GL and the same data line DL and receive the control voltage and the input voltage, the first and second switching elements TFT_A and TFT_B may have the same output voltage. The output voltage of the second switching element TFT_B may drop due to the variable resistor R and be then applied to the second sub-pixel electrode 190_B. Therefore, a voltage level applied to the second sub-pixel electrode 190_B may be lower than a voltage level applied to the first sub-pixel electrode 190_A.

Although not illustrated, a light blocking member may be disposed in the lower substrate 100. In addition, a polarizer (not illustrated) may be disposed on an outer surface of the lower substrate 100.

The upper substrate 300 may include a second substrate 310 and a common electrode 320 disposed on the second substrate 310. In an exemplary embodiment, a second alignment film (not illustrated) may be disposed on the common electrode 320. In an exemplary embodiment, a polarizer (not illustrated) may be further disposed on an outer surface of the upper substrate 300.

In an exemplary embodiment, the first and second alignment films may be vertical alignment films.

In an exemplary embodiment, the liquid crystal layer 200 may have a negative dielectric anisotropy. The liquid crystal molecules of the liquid crystal layer 200 may be aligned so that major axes thereof are vertical to the surfaces of the lower and upper substrates 100 and 300 when no electric field is generated.

As described above, in the LCD 1000 according to the exemplary embodiment, different voltage levels may be applied to the first sub-pixel electrode 190_A and the second sub-pixel electrode 190_B. Hence, different electric fields may be generated in a first liquid crystal region 200_A between the first sub-pixel electrode 190_A and the common electrode 320 and a second liquid crystal region 200_B between the second sub-pixel electrode 190_B and the common electrode 320. Therefore, tilt angles of the liquid crystal molecules may be different from each other in the first and second liquid crystal regions 200_A and 200_B and transmittances of the first liquid crystal region 200_A and the second liquid crystal region 200_B may be different from each other. Consequently, the brightness of light passing through the first liquid crystal region 200_A may be different from the brightness of light passing through the second liquid crystal region 200_B.

In this manner, by dividing the single pixel into the plurality of regions having different brightness and gradually adjusting the change in transmittance according to the gray scale, it is possible to prevent rapid change of the transmittance according to the gray scale at a lateral side of the pixel and it is possible to obtain lateral visibility that is close to front visibility.

Figure 5:
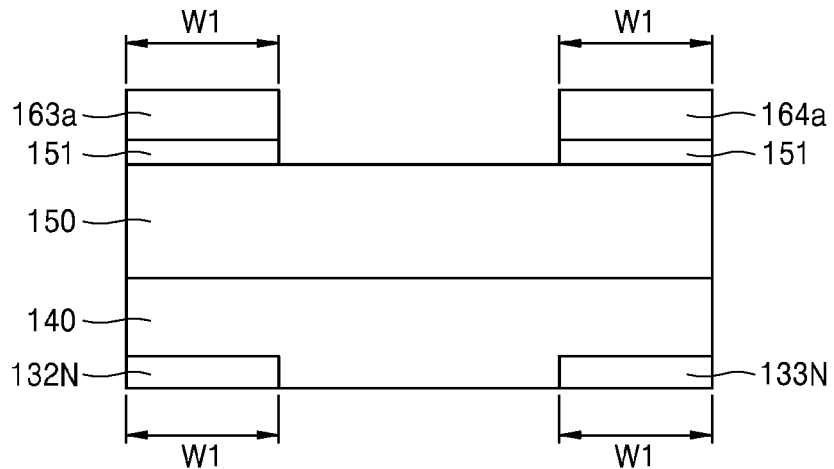
FIG. 5 is a cross-sectional view taken along line B-B' of FIG. 3 illustrating an exemplary embodiment of a variable resistor of the LCD, according to the invention.

FIG. 5 is a cross-sectional view taken along line B-B' of FIG. 3 illustrating the variable resistor R (refer to FIG. 1) of the LCD 1000, according to an exemplary embodiment.

The variable resistor R may include the control electrodes 132N and 133N, the gate insulator 140 that includes a semiconductor material and covers the control electrodes 132N and 133N, a high-concentration semiconductor layer 151 for ohmic contact, the input electrode 163*a*, and the output electrode 164*a*. As illustrated in FIG. 4, the variable resistor R may share the channel layer 150 used in the first and second switching elements TFT_A and TFT_B.

In the exemplary embodiment, areas of the control electrodes 132N and 133N facing the channel layer 150 may be larger than or equal to areas of the input electrode 163*a* and the output electrode 164*a* facing the channel layer 150. The area of the control electrode 132N facing the channel layer 150 may be larger than or equal to the area of the input electrode 163*a* facing the channel layer 150, and the area of the control electrode 133N facing the channel layer 150 may be larger than or equal to the area of the output electrode 164*a* facing the channel layer 150. In an alternative exemplary embodiment, the sum of the areas of the control electrodes 132N and 133N facing the channel layer 150 may be greater than or equal to the sum of the areas of the input electrode 163*a* and the output electrode 164*a* facing the channel layer 150.

In an exemplary embodiment, as illustrated in FIG. 5, widths of the control electrodes 132N and 133N may be equal to widths of the input electrode 163*a* and the output electrode 164*a*, for example.

In FIG. 5, all of the widths of the input electrode 163*a* and the output electrode 164*a* and the control electrodes 132N and 133N are equal to W1, but the invention is not limited thereto. In exemplary embodiments, the with of the control electrode 132N may be greater than or equal to the width of the input electrode 163*a*, and the width of the control electrode 133N may be greater than or equal to the width of the output electrode 164*a*. As described above with reference to the plan view of FIG. 3, the direction of the width is a direction from the center of the first sub-pixel electrode 190_A to the center of the second sub-pixel electrode 190_B.

Figure 6:
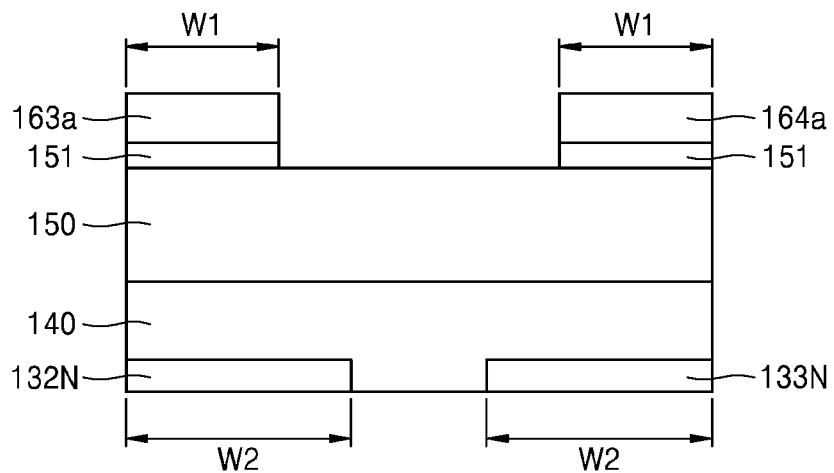
FIG. 6 is a cross-sectional view taken along line B-B' of FIG. 3, illustrating another exemplary embodiment of a variable resistor of the LCD, according to the invention.

FIG. 6 is a cross-sectional view taken along line B-B' of FIG. 3, illustrating a variable resistor of an LCD, according to another exemplary embodiment.

As illustrated in FIG. 6, widths W1 of an input electrode 163*a* and an output electrode 164*a* are W1 are narrower than widths W2 of control electrodes 132N and 133N.

In the exemplary embodiment, the widths W2 of the control electrodes 132N and 133N are made greater than the widths W1 of the input electrode 163*a* and the output electrode 164*a* so as to implement a function of varying a resistance value by using the control electrodes 132N and 133N and reach a target resistance value in an easier manner. In an exemplary embodiment, the resistance value of the variable resistor R may be adjusted in the range of about 0.1 MΩ to about 1,000 MΩ, for example.

Figure 7:
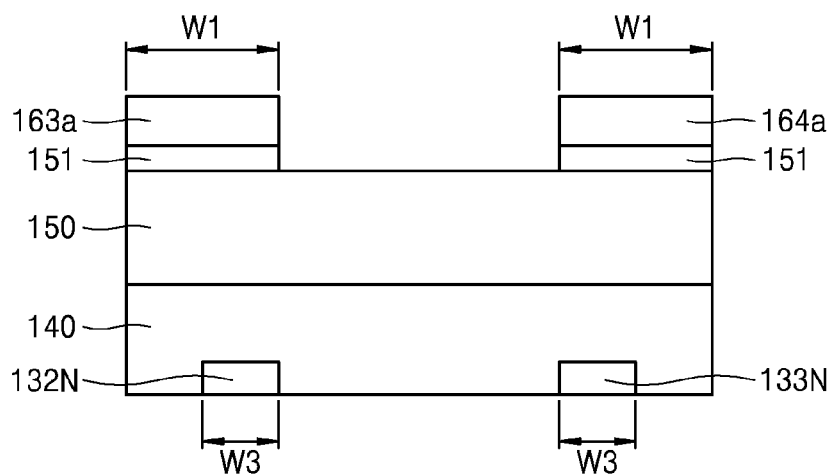
FIG. 7 is a cross-sectional view taken along line B-B' of FIG. 3, illustrating comparative example of a variable resistor of an LCD, according to the invention.

FIG. 7 is a cross-sectional view taken along line B-B' of FIG. 3, illustrating a variable resistor of an LCD, according to comparative example.

As illustrated in FIG. 7, in comparative example, widths W3 of the control electrodes 132N and 133N are narrower than widths W1 of an input electrode 163*a* and an output electrode 164*a*.

In the cases illustrated in FIGS. 5 to 7, the resistance value was experimentally observed while changing the voltage applied to the control electrodes 132N and 133N. As an experimental observation result, it was verified that the resistance was not controlled when the widths of the control electrodes 132N and 133N were narrower than the widths of the input electrode 163*a* and the output electrode 164*a* as illustrated in FIG. 7.

In addition, when the widths of the control electrodes 132N and 133N were greater than or equal to the widths of the input electrode 163*a* and the output electrode 164 as illustrated in FIGS. 5 and 6, a significant change in resistance was not observed in a thickness distribution of the channel layer 150. In other words, since the resistance is insensitive to the thickness distribution, it is possible to obtain a stable resistance value.

Figure 8A:
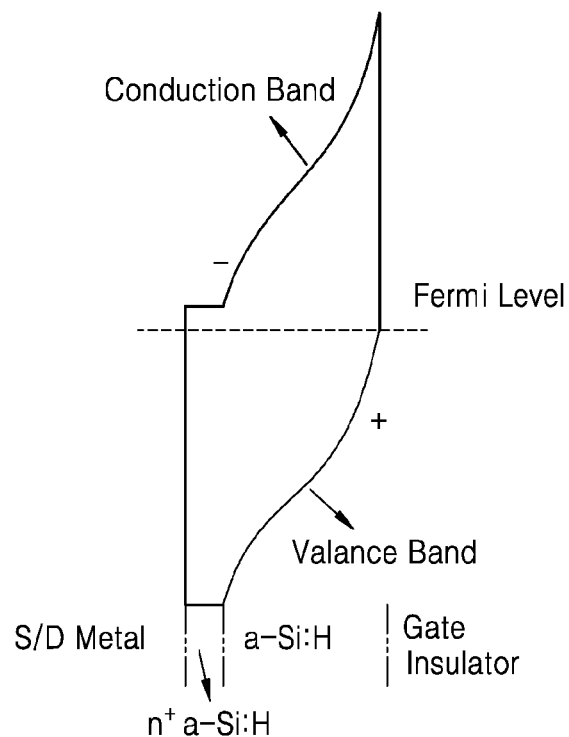
FIGS. 8A and 8B are graphs of exemplary embodiments of energy bands in the variable resistor of the LCD, respectively, when a voltage applied to an input electrode is higher than a voltage applied to a control electrode and when a voltage applied to the control electrode is higher than a voltage applied to the input electrode, according to the invention.
Figure 8B:
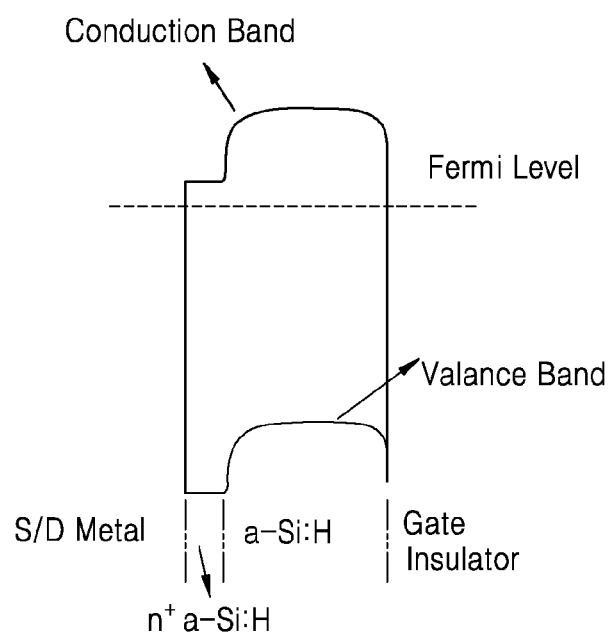

FIGS. 8A and 8B are graphs of energy bands in the variable resistor of the LCD, respectively, when a voltage applied to the input electrode is higher than a voltage applied to the control electrode and when a voltage applied to the control electrode is higher than a voltage applied to the input electrode, according to exemplary embodiments In FIGS. 8A and 8B, it is assumed that the semiconductor material of the channel layer and the high-concentration semiconductor layer are a-Si:H, for example.

Referring to FIGS. 8A and 8B, in the case of FIG. 8B where the voltage applied to the control electrodes are higher than the voltage applied to the input electrode, a characteristic distribution due to the thickness distribution of a-Si:H may be stabilized.

Figure 9:
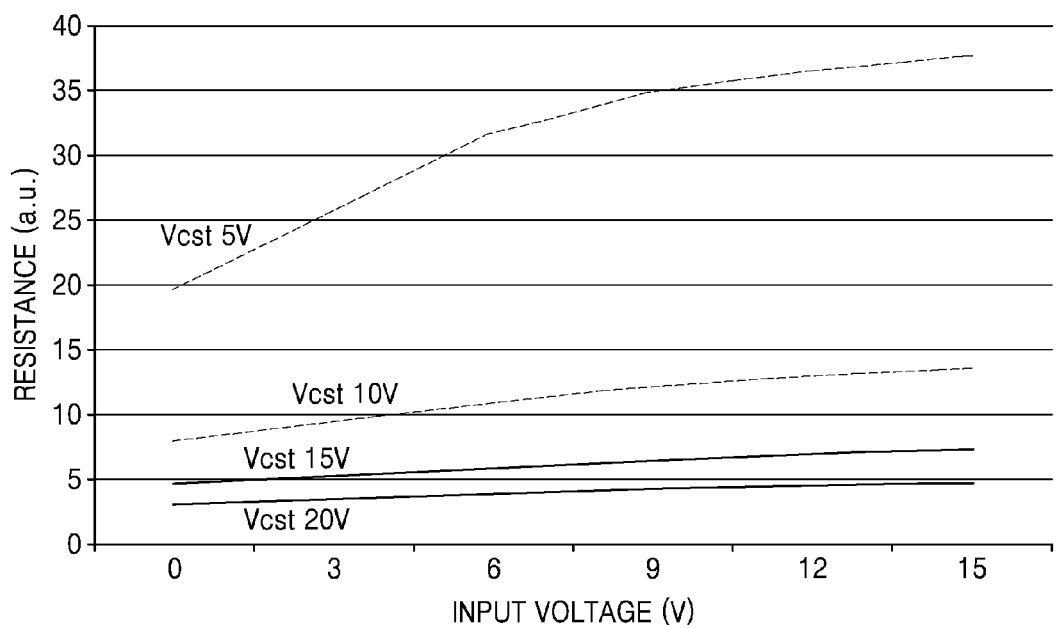
FIG. 9 is a graph of a change in a resistance of the variable resistor according to an input voltage applied to a data line and a voltage applied to control electrodes.

FIG. 9 is a graph of a change in the resistance of the variable resistor according to an input voltage applied to the data line and a voltage applied to the control electrodes 132N and 133N.

In FIG. 9, a horizontal axis represents the input voltage applied to the data line and Vcst represents the voltage applied to the control electrodes 132N and 133N. As illustrated in FIG. 3, the same voltage is applied to the control electrodes 132N and 133N and the storage electrode 131.

Referring to the graph, as the voltage applied to the control electrodes 132N and 133N increases, the resistance according to the input voltage gradually changes, thus obtaining a stable resistance value.

Figure 10:
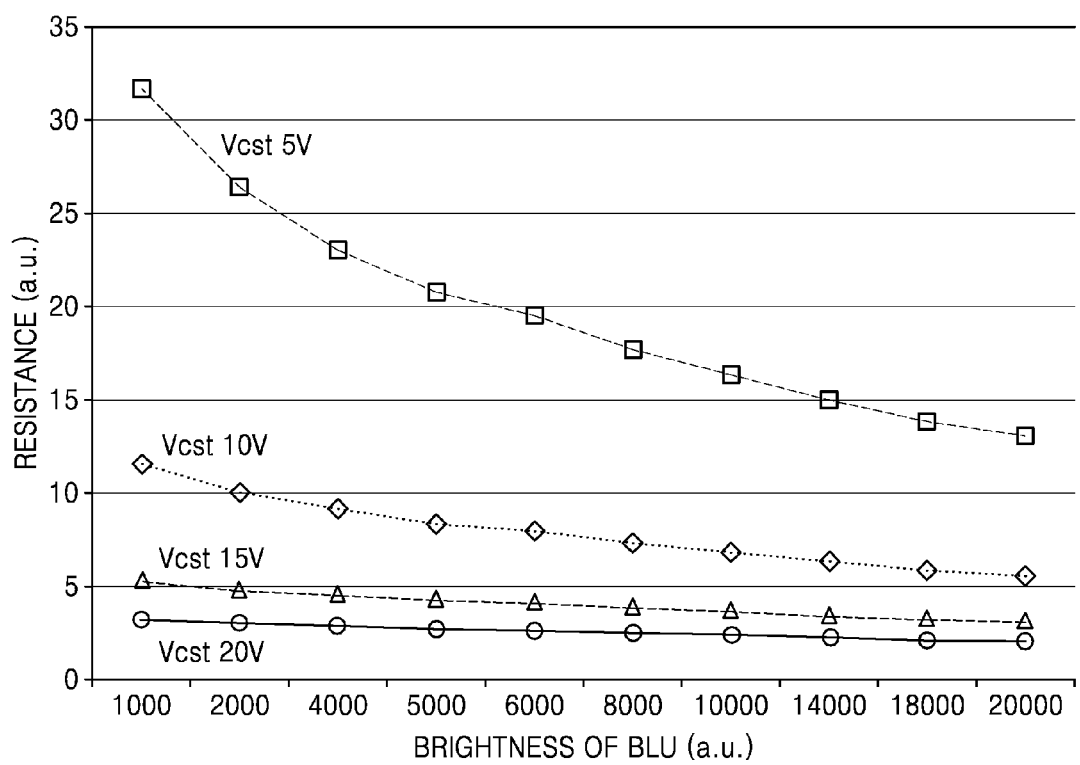
FIG. 10 is a graph of a variation in a resistance of a variable resistor according to a brightness of a backlight unit and a voltage applied to control electrodes.

FIG. 10 is a graph of a change in the resistance of the variable resistor R according to a brightness of a backlight unit BLU and a voltage applied to the control electrodes 132N and 133N.

In FIG. 10, a horizontal axis represents the brightness of the backlight unit BLU provided in the LCD. Vcst represents the voltage applied to the control electrodes 132N and 133N. As illustrated in FIG. 3, the same voltage is applied to the control electrodes 132N and 133N and the storage electrode 131. Light emitted from the backlight unit BLU may affect the variable resistor R. Referring to the graph, as the voltage applied to the control electrodes 132N and 133N increases, the resistance according to the brightness of the backlight unit BLU gradually changes, thus obtaining a stable resistance value.

As described above, a high voltage may be applied to the control electrodes 132N and 133N so as to obtain a stable value of the variable resistor R. As illustrated in FIG. 3, since the control electrodes 132N and 133N are connected to the storage electrode 131, the high voltage applied to the storage electrode 131 may cause light leakage in a liquid crystal region corresponding to an edge of the storage electrode 131. The light leakage may be prevented by modifying the shape of the first and second sub-pixel electrodes 190_A and 190_B or the storage electrode 131 at the edge thereof.

Figure 11:
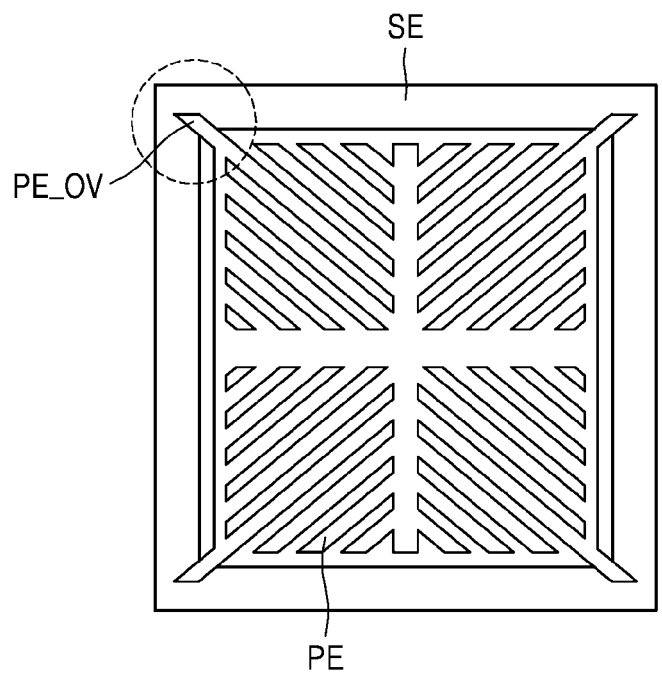
FIG. 11 is a plan view of another exemplary embodiment of an LCD in which a pixel electrode overlaps a storage electrode, according to the invention.
Figure 12:
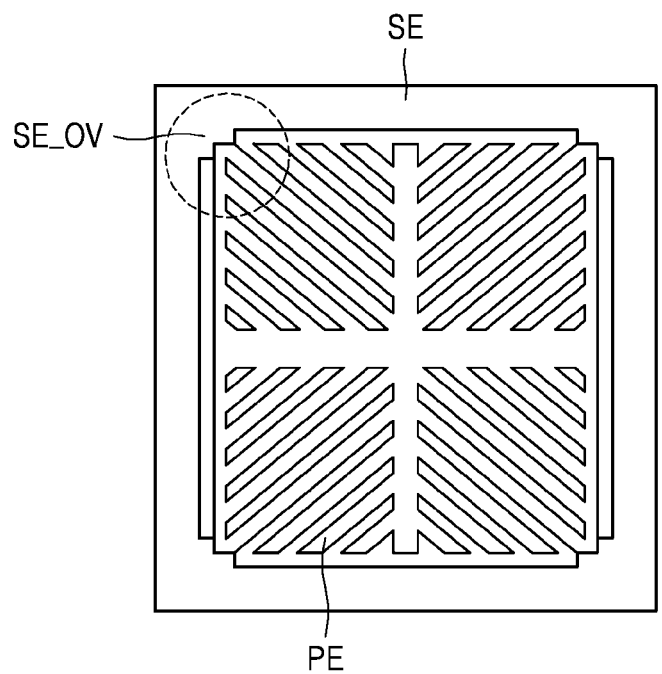
FIG. 12 is a plan view of another exemplary embodiment of an LCD in which a pixel electrode overlaps a storage electrode, according to the invention.

FIGS. 11 and 12 are plan views of an LCD in which a pixel electrode PE overlaps a storage electrode SE, according to another exemplary embodiment.

FIGS. 11 and 12 illustrate only a portion where the pixel electrode PE overlaps the storage electrode SE in the LCD, according to another exemplary embodiment, and the other portions are substantially identical to those described above with reference to FIGS. 1 to 4.

Light leakage may be caused by a coupling between the common electrode 320 on the upper substrate 300 and the storage electrode SE to which the high voltage is applied.

In the exemplary embodiment of FIG. 11, an overlap region PE_OV overlapping the storage electrode SE may be provided in the pixel electrode PE so as to shield the coupling between the storage electrode SE and the common electrode 320 (refer to FIGS. 1 and 4). As illustrated in FIG. 11, the pixel electrode PE may include a cross-shaped stem electrode and a plurality of branch electrodes extending from the cross-shaped stem electrode. The overlap region PE_OV may be provided by extending at least one of the plurality of branch electrodes toward the edge of the storage electrode SE.

In the exemplary embodiment of FIG. 12, an overlap region SE_OV overlapping the pixel electrode PE may be provided in the storage electrode SE. In the exemplary embodiment, the overlap region SE_OV may be provided by modifying the shape of the edge of the storage electrode SE. The overlap region SE_OV may be provided by protruding the edge of the storage electrode SE in a direction toward at least one of the branch electrodes provided in the pixel electrode PE.

Figure 13:
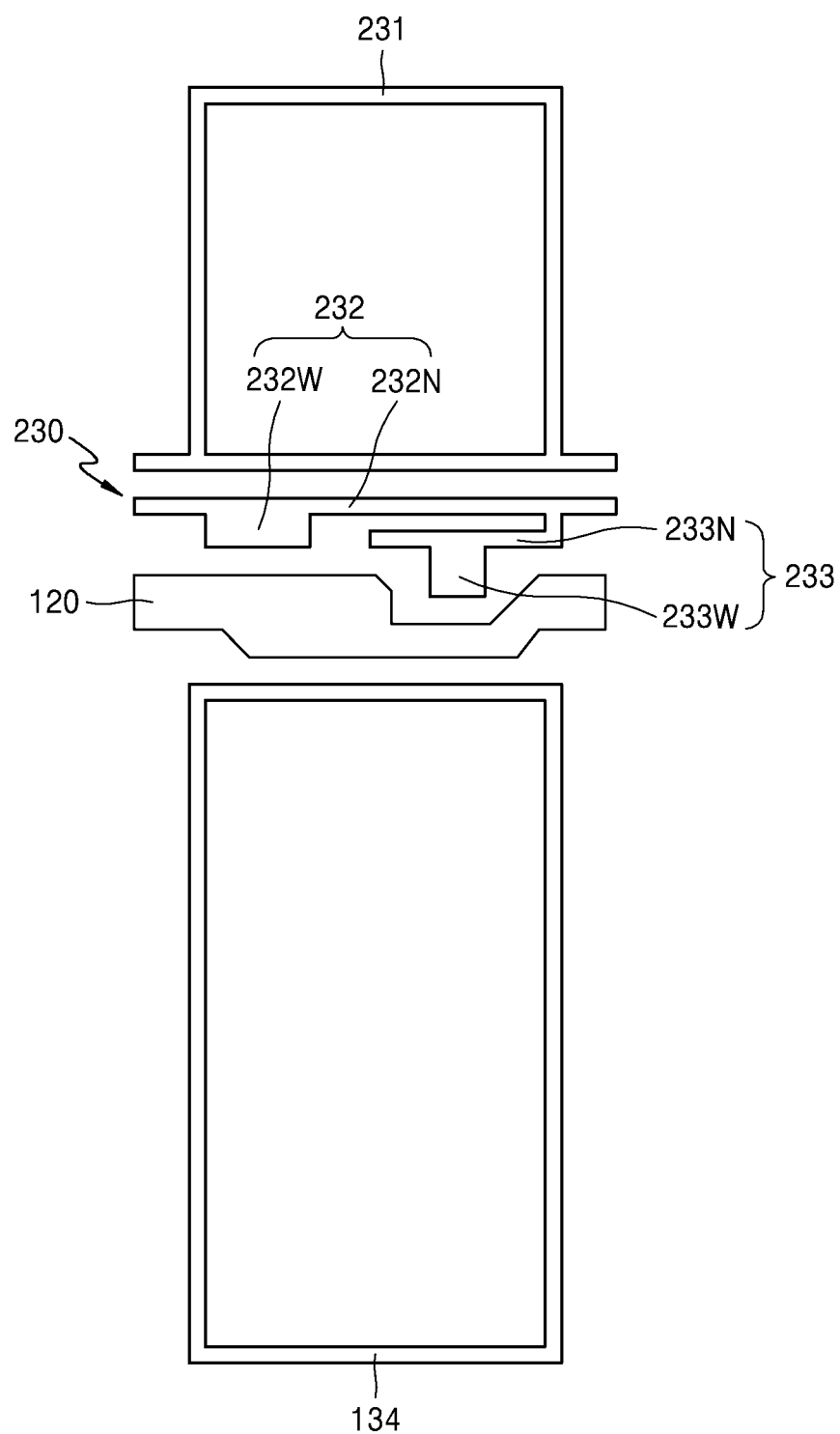
FIG. 13 is a plan view of another exemplary embodiment of a layer on which a gate electrode, storage electrodes, and a voltage-division electrode are disposed in an LCD, according to the invention.

FIG. 13 is a plan view of a layer on which a gate electrode 120, storage electrodes 231 and 134, and a voltage-division electrode 230 including first and second voltage-division electrodes 232 and 233 are disposed in an LCD, according to another exemplary embodiment.

In the exemplary embodiment, unlike in the plan view of FIG. 3, the voltage-division electrode 230 is electrically separated from the storage electrode 231. A high voltage applied to the voltage-division electrode 230, that is, a control voltage of a variable resistor, may not affect the storage electrode 231, thus reducing light leakage at an edge of the storage electrode 231.

In the LCDs according to the exemplary embodiments, when different voltages are applied to the two sub-pixel electrodes, the variable resistor may be used to drop the output voltage of the switching element. Thus, it is possible to reduce the number of contact holes and improve the aperture ratio.

In an exemplary embodiment, the first voltage-division electrode 232 may include a wide-width region 232W having a wide width in a longitudinal direction and a narrow-width region 232N having a narrow width in the longitudinal direction. In an exemplary embodiment, the second voltage-division electrode 233 may include a wide-width region 233W having a wide width in the longitudinal direction and a narrow-width region 233N having a narrow width in the longitudinal direction.

In addition, it is possible to improve the resistance change stability according to the input voltage or the thickness distribution of the channel layer through the area design of the control electrodes and the input and output electrodes constituting the variable resistor.

It should be understood that exemplary embodiments described herein should be considered in a descriptive sense only and not for purposes of limitation. Descriptions of features or exemplary embodiments within each exemplary embodiment should typically be considered as available for other similar features or exemplary embodiments in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A liquid crystal display comprising:
   a first substrate;
   a first sub-pixel electrode and a second sub-pixel electrode which are disposed on the first substrate and spaced apart from each other in a first direction, and to which different voltages are respectively applied to the first sub-pixel electrode and the second sub-pixel electrode;
   a first switching element which controls a voltage applied to the first sub-pixel electrode;
   a second switching element which controls a voltage applied to the second sub-pixel electrode;
   a variable resistor which drops an output voltage of the second switching element and apply the dropped output voltage to the second sub-pixel electrode;
   a second substrate which is opposite to the first substrate;
   a common electrode disposed on the second substrate; and
   a liquid crystal layer disposed between the first substrate and the second substrate
   wherein the variable resistor comprises:
   a control electrode;
   an insulating layer covering the control electrode;
   a channel layer disposed on the insulating layer, the channel layer including a semiconductor material; and
   an input electrode and an output electrode spaced apart from each other on the channel layer,
   wherein the control electrode comprises first and second control electrodes respectively facing the input electrode and the output electrode and spaced apart from each other in the first direction, and
   widths of the first and second control electrodes in the first direction are greater than or equal to widths of the input electrode and the output electrode in the first direction.

2. The liquid crystal display of claim 1, wherein an area of the control electrode facing the channel layer is larger than or equal to an area of the input electrode and the output electrode facing the channel layer.

3. The liquid crystal display of claim 1, wherein a voltage applied to the control electrode is higher than a voltage applied to the input electrode.

4. The liquid crystal display of claim 1, wherein the variable resistor shares channel layers provided in the first and second switching elements.

5. The liquid crystal display of claim 4, further comprising a high-concentration semiconductor layer between the channel layer and the input electrode and between the channel layer and the output electrode.

6. The liquid crystal display of claim 1, wherein the channel layer further including amorphous silicon (a-Si).

7. The liquid crystal display of claim 1, wherein a resistance value of the variable resistor is adjusted in the range of about 0.1 mega-ohm to about 1,000 mega-ohms.

8. The liquid crystal display of claim 1, further comprising a storage electrode surrounding the first sub-pixel electrode,
wherein the control electrode is connected to the storage electrode.

9. The liquid crystal display of claim 8, wherein at least a portion of the storage electrode overlaps the first sub-pixel electrode at an edge of the storage electrode.

10. The liquid crystal display of claim 9, wherein the first sub-pixel electrode comprises a cross-shaped stem electrode and a plurality of branch electrodes extending from the cross-shaped stem electrode.

11. The liquid crystal display of claim 10, wherein at least one of the plurality of branch electrodes extending toward the edge of the storage electrode overlaps the storage electrode.

12. The liquid crystal display of claim 10, wherein the edge of the storage electrode protrudes toward at least one of the plurality of branch electrodes.

13. The liquid crystal display of claim 1, further comprising a storage electrode surrounding the first sub-pixel electrode,
wherein the control electrode is electrically separated from the storage electrode.

14. A liquid crystal display comprising:
a first substrate;
a first sub-pixel electrode and a second sub-pixel electrode which are disposed on the first substrate and spaced apart from each other in a first direction, and to which different voltages are respectively applied to the first sub-pixel electrode and the second sub-pixel electrode;
a first switching element which controls a voltage applied to the first sub-pixel electrode;
a second switching element which controls a voltage applied to the second sub-pixel electrode;
a variable resistor which drops an output voltage of the second switching element and apply the dropped output voltage to the second sub-pixel electrode;
a second substrate which is opposite to the first substrate;
a common electrode disposed on the second substrate; and
a liquid crystal layer disposed between the first substrate and the second substrate,
wherein the first and second switching elements are connected to the same gate line and the same data line,
wherein the variable resistor comprises:
a control electrode;
an insulating layer covering the control electrode;
a channel layer disposed on the insulating layer, the channel layer including a semiconductor material; and
an input electrode and an output electrode spaced apart from each other on the channel layer,
wherein the control electrode comprises first and second control electrodes respectively facing the input electrode and the output electrode and spaced apart from each other in the first direction, and
widths of the first and second control electrodes in the first direction are greater than or equal to widths of the input electrode and the output electrode in the first direction.

* * * * *